United States Patent [19]

Wada et al.

[11] Patent Number: 5,278,651
[45] Date of Patent: Jan. 11, 1994

[54] METHOD AND APPARATUS FOR SYNCHRONIZING RESPECTIVE PHASES OF HIGH DEFINITION TELEVISION SIGNAL COMPONENTS

[75] Inventors: Yoshiyuki Wada, Yokohama; Hiroaki Kawasumi, Kashiwa, both of Japan

[73] Assignee: Fujitsu Limited, Kawasaki, Japan

[21] Appl. No.: 706,241

[22] Filed: May 28, 1991

[30] Foreign Application Priority Data

May 28, 1990 [JP] Japan .................. 2-137550

[51] Int. Cl.⁵ .............................. H04N 5/04
[52] U.S. Cl. .................... 358/149; 358/17; 358/320; 358/148
[58] Field of Search ............. 358/148, 149, 141, 17, 358/19, 334, 320, 323, 31, 36.1; 360/36.2, 22; H04N 5/04

[56] References Cited

U.S. PATENT DOCUMENTS

| 4,101,926 | 7/1978 | Dischert et al. | 358/19 |
| 4,456,930 | 6/1984 | Hashimoto | 358/20 |
| 4,485,395 | 11/1984 | Warren | 358/323 |
| 4,672,470 | 6/1987 | Morimoto et al. | 358/334 |
| 4,701,783 | 10/1987 | Glenn | 358/31 |
| 4,760,468 | 7/1988 | Nakano et al. | 358/320 |
| 4,792,846 | 12/1988 | Penny | 358/17 |
| 5,091,774 | 2/1992 | Lovely et al. | 358/17 |

FOREIGN PATENT DOCUMENTS

| 74277 | 6/1980 | Japan | H04N 5/783 |
| 60-103894 | 8/1985 | Japan | H04N 9/86 |
| 56040 | 3/1987 | Japan | H04L 7/00 |

Primary Examiner—James J. Groody
Assistant Examiner—Glenton B. Burgess

[57] ABSTRACT

An apparatus which receives a high definition television (HDTV) signal having a plurality of signal components, delays a reference signal component which is one of the plurality of signal components and synchronizes respective phases of the plurality of signal components with the phase of the reference signal component.

14 Claims, 10 Drawing Sheets

METHOD AND APPARATUS FOR SYNCHRONIZING RESPECTIVE PHASES OF HIGH DEFINITION TELEVISION SIGNAL COMPONENTS

BACKGROUND OF THE INVENTION

The present invention relates generally to a method and apparatus for synchronizing respective phases of high definition television signal components. The present invention is applicable to an encoder which encodes the high definition television signal.

The high definition television (abbreviated HDTV hereinafter) signal consists of a combination of red (R), green (G) and blue (B) signal components (referred to as a RGB signal hereinafter) or one luminance signal (Y) and two color-difference signal ($P_R$ and $P_B$) components (referred to as a $YP_RP_B$ signal hereinafter). Each signal component of the RGB signal has a bandwidth of 30 MHz. On the other hand, in the $YP_RP_B$ signal, combinations of the Y signal with 20 MHz and each of the $P_R$ and $P_B$ signals with 7 MHz and the Y signal with 30 MHz and each of the $P_R$ and $P_B$ signals with 15 MHz are known. The RGB signal or the $YP_RP_B$ signal is encoded at a basic rate of 1.2 Gbit/s by means of a pulse code modulation (PCM) encoding method, an interframe encoding method, or the like.

The respective signal components of the RGB signal or the $YP_RP_B$ signal are individually transmitted via different coaxial cables. Therefore, each phase of each of the three signal components must be successfully synchronized with one another, otherwise the image quality will be lowered so that, for instance, a picture includes a blurred edge. Accordingly, many restrictions are imposed on a conventional HDTV system design to synchronize respective phases of the HDTV signal components. For example, interfaces are standardized and coaxial cables each having the same length are used. In the more concrete conventional HDTV system shown in FIG. 1 comprising a video tape recorder (VTR) 41, an encoder 47 and an optical transmission line 48, respective interfaces used for the VTR 41 and the encoder 47 are standardized and each coaxial cable therebetween has the same length. The encoder 47 comprises analog to digital (A/D) converters 42-1 to 42-3, a horizontal synchronizing signal detecting circuit 43, a phase locked loop (PLL) circuit 44, a processor 45 and an electric to optical converter (referred to as OS hereinafter) 46. Each HDTV signal component is transmitted from the VTR 41 to the encoder 47 via a corresponding coaxial cable connected to a corresponding one of the A/D converters 42-1 to 42-3. The synchronizing signal detecting circuit 43 is coupled to one of the coaxial cable and the PLL circuit 44. The PLL circuit 44 is further connected to respective A/D converters 42-1 to 42-3. The A/D converters 42-1 to 42-3 are respectively connected to the processor 45, and the processor 45 is connected to the OS 46. The horizontal synchronizing signal detecting circuit 43 detects a horizontal synchronizing signal of one of the signal components, for example, the Y signal.

In operation, each signal component of the $YP_RP_B$ signal is first input from the VTR 41 to the corresponding A/D converter via the corresponding coaxial cable. On the other hand, the Y signal is input to the horizontal synchronizing signal detecting circuit 43, so that the horizontal synchronizing signal thereof is detected. Next, the PLL circuit 44 divides and synchronizes its clock with the detected horizontal synchronizing signal. Then the clock is output to respective A/D converters 42-1 to 42-3 so as to be used for the sampling of each signal component. Thus, each analog signal component is converted into a digital signal component and input into the processor 45. Then the processor 45 encodes each digital signal component and outputs it to the OS 46. Lastly, the OS 46 converts the HDTV signal into the optical signal and transmits it via an optical transmission line 48.

However, the above conventional HDTV system has the following disadvantage in that too many restrictions are imposed on the system design thereof.

SUMMARY OF THE INVENTION

Accordingly, it is a general object of the present invention to provide a method and apparatus for synchronizing respective phases of HDTV signal components in which the aforementioned disadvantage is eliminated.

Another object of the present invention is to provide a method and apparatus for synchronizing respective phases of HDTV signal components which moderate restrictions on the HDTV system design.

According to one feature of the present invention, an apparatus which receives a high definition television (HDTV) signal comprising a plurality of signal components, comprises reference signal delay means for delaying a reference signal component which is one of the plurality of signal components, and synchronizing means for synchronizing respective phases of the plurality of signal components with that of the reference signal component.

According to another feature of the present invention, an apparatus which receives a HDTV signal comprising first, second and third signal components, comprises first synchronizing signal detecting means for detecting a first synchronizing signal from the first signal, second synchronizing signal detecting mean for detecting a second synchronizing signal from the second signal, third synchronizing signal detecting means for detecting a third synchronizing signal from the third signal, and correction means, coupled to the first, second and third synchronizing signal detecting means, for correcting phase differences among the first, second and third synchronizing signals so that respective phases of the first, second and third signal components can be synchronized with one another.

According to another feature of the present invention, a method for synchronizing respective phases of high definition television signal (HDTV) comprising first, second and third signal components comprises the steps of detecting a first synchronizing signal of the first signal, detecting a second synchronizing signal of the second signal, detecting a third synchronizing signal of the third signal, and correcting time differences among the first, second and third synchronizing signals so that each phase of each signal component can be synchronized with one another.

According to still another feature of the present invention, a method for synchronizing respective phases of HDTV comprising first, second and third signal components comprises the steps of delaying a reference signal component which is one of the plurality of signal components, and synchronizing respective phases of the plurality of signal components with that of the reference signal component.

According to still further feature of the present invention, a method for synchronizing respective phases of a HDTV signal comprising first, second and third signal components comprising the steps of detecting a first synchronizing signal of the first signal, detecting a second synchronizing signal of the second signal, detecting a third synchronizing signal of the third signal, and correcting time differences among the first, second and third synchronizing signals so that each phase of each signal component can be synchronized with one another.

According to the present invention, the time differences among the first, second and third signal components can be easily detected based on the extracted first, second and third synchronizing signals. Moreover, many conventional restrictions on the HDTV system, such as standardized interfaces and coaxial cables respectively having the same length, are not needed.

Other objects and further features of the present invention will become apparent from the detailed description when read in conjunction with the accompanying drawings.

DESCRIPTION OF THE PREFERRED EMBODIMENTS

Figure 2:
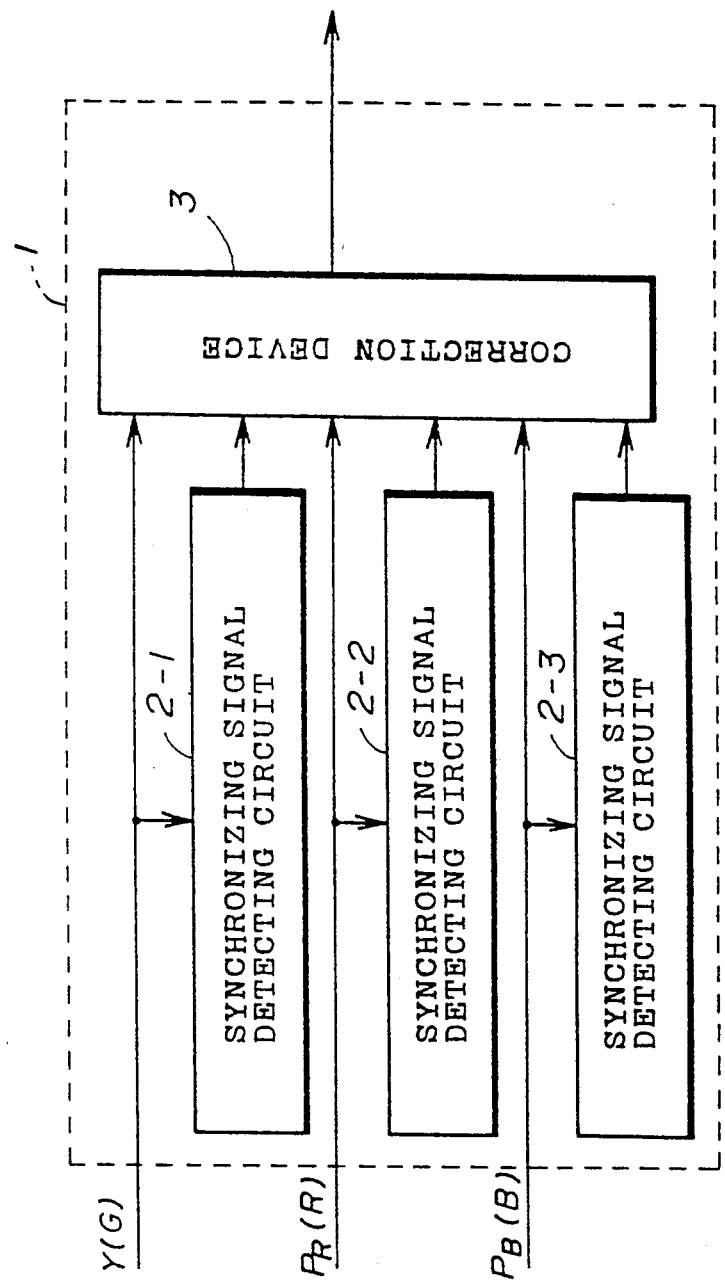
FIG. 2 shows a first principle block diagram of the present invention.

The apparatus 1 for synchronizing the phases of respective HDTV signal components of the first embodiment according to the present invention comprises, as shown in FIG. 2, synchronizing signal detecting circuits 2-1 to 2-3 and a correction device 3. The synchronizing signal detecting circuits 2-1 to 2-3 are coupled to respective coaxial cables through which respective HDTV signal components are transmitted. More specifically, the circuit 2-1 is coupled to the cable through which the Y signal (or G signal) is transmitted, the circuit 2-2 is coupled to the cable through which the $P_R$ signal (or R signal) is transmitted, and the circuit 2-3 is coupled to the cable through which the $P_B$ signal (or B signal) is transmitted. The correction device 3 is coupled to the respective coaxial cables and respective outputs of the synchronizing signal detecting circuits 2-1 to 2-3.

The synchronizing signal detecting circuits 2-1 to 2-3 detect and extract respective synchronizing signals from among the corresponding HDTV signal components. Each synchronizing signal is, for example, a horizontal synchronizing signal, a vertical synchronizing signal, or a signal generated based on the horizontal synchronizing signal and/or the vertical synchronizing signal.

The correction device 3 calculates and corrects time differences among the three synchronizing signals included in the HDTV signal components in order to synchronize respective phases thereof. The correction device 3 may calculate the time differences between the synchronizing signals of two signal components, the Y signal and the $P_R$ signal, the $P_R$ signal and the $P_B$ signal, and the $P_B$ signal and the Y signal. However, since only two combinations of the signal components are quite sufficient, if the Y signal is determined as a reference signal, the correction device 3 may calculate the time difference between the synchronizing signals of the Y signal and the $P_R$ signal and the time difference between the $P_B$ signal and the Y signal. Hereupon, the term "a reference signal", as used herein, mean a signal which is used twice when the both time differences are calculated. Moreover, the correction device 3 may calculate the time differences by means of comparing each synchronizing signal with another reference signal generated therein. Therefore, the correction device 3 may have a signal generator.

In operation, the HDTV signal components are input into the apparatus 1 via the respective coaxial cables, so that the HDTV signal components are input to the respective synchronizing signal detecting circuits 2-1 to 2-3 and the correction device 3. Then each synchronizing signal is extracted by and input from a corresponding one of the synchronizing signal detecting circuits 2-1 to 2-3 to the correction device 3. Consequently, the correction device 3 calculates the time differences among three synchronizing signals based on the outputs of the respective synchronizing signal detecting circuits 2-1 to 2-3. Furthermore, the correction device 3 corrects the time differences so that the respective phases of the HDTV signal components are synchronized with one another. Then, the HDTV signal in which the phase of each of the signal components is synchronized is generated by and output from the apparatus 1 via the correction device 3.

Figure 3:
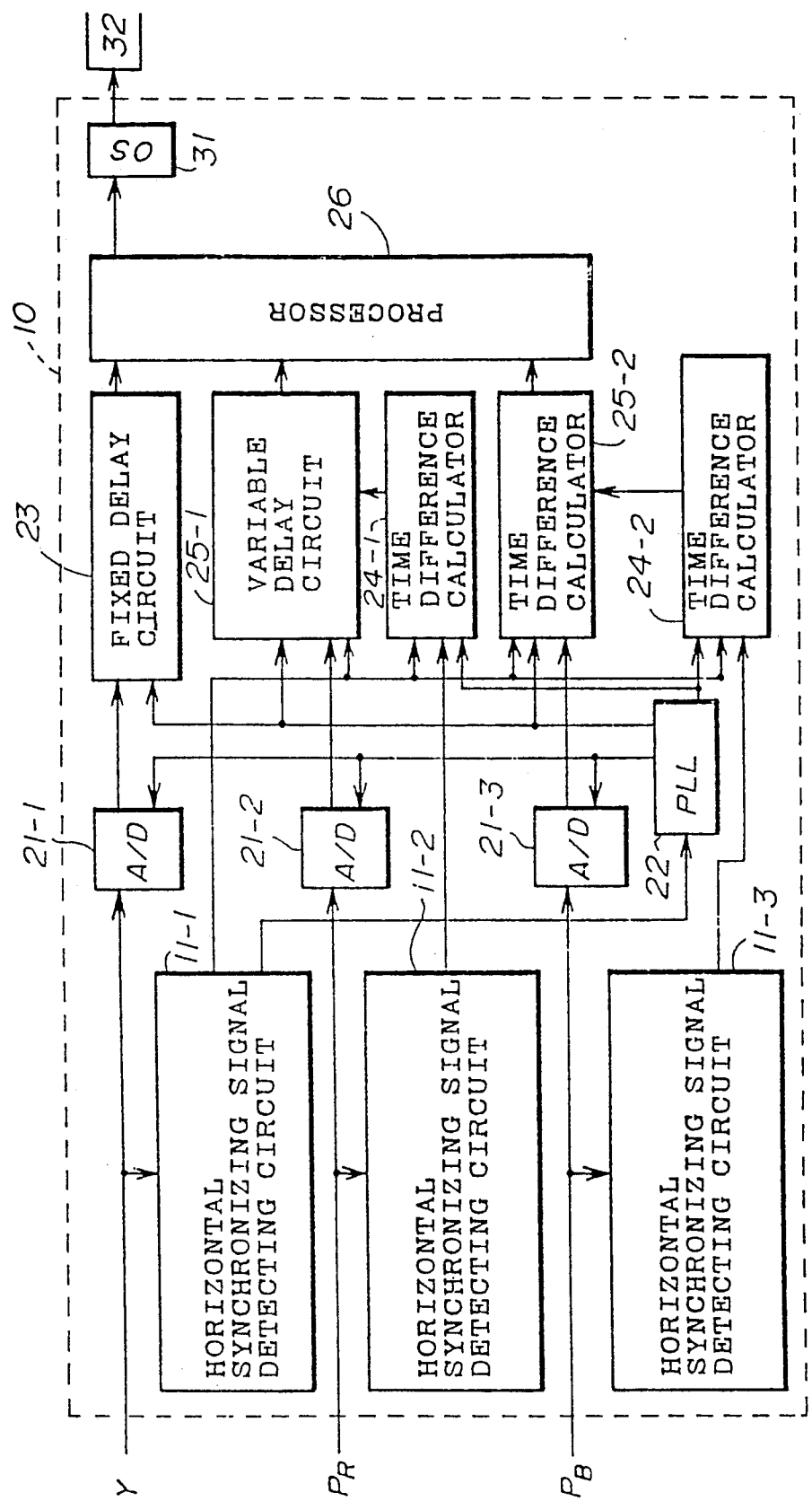
FIG. 3 shows a block diagram of an encoder of a first embodiment according to the present invention.

A description will now be given of the encoder of the first embodiment according to the present invention. An encoder 10 comprises, as shown in FIG. 3, horizontal synchronizing signal detecting circuits 11-1 to 11-3, A/D converters 21-1 to 21-3, a PLL circuit 22, a fixed delay circuit 23, time difference calculators 24-1 and 24-2, variable delay circuits 25-1 and 25-2, a processor 26 and an OS 31. In this embodiment, the Y signal, $P_R$ signal and $P_B$ signal are respectively input into the encoder 10 via respective coaxial cables. In addition, the encoder 10 is coupled to an optical line transmission 32. Each of the horizontal synchronizing signal detecting circuits 11-1 to 11-3 and each of the A/D converters 21-1 to 21-3 are respectively coupled to the corresponding coaxial cable. The A/D converter 21-1 is further coupled to the fixed delay circuit 23. The A/D converter 21-2 is further coupled to the variable delay circuit 25-1. The A/D converter 21-3 is further coupled to the variable delay circuit 25-2. The horizontal synchronizing signal detecting circuit 11-1 is further coupled to the PLL circuit 22, the time difference calculators 24-1 and 24-2 and the variable delay circuits 25-1 and 25-2. The horizontal synchronizing signal detecting circuit 11-2 is further coupled to the time difference calculator 24-1. The horizontal synchronizing signal detecting circuit 11-3 is further coupled to the time difference calculator 24-2. The PLL 22 is coupled to the A/D converters 21-1 to 21-3, the fixed delay circuit 23, the time difference calculators 24-1 and 24-2 and the variable delay circuits 25-1 and 25-2. The time difference calculator 24-1 is further coupled to the variable delay circuit 25-1. The time difference calculator 24-2 is further coupled to the variable delay circuit 25-2. The fixed delay circuit 23 and the variable delay circuits 25-1 and 25-2 are respectively coupled to the processor 26. The processor 26 is further coupled to the OS 31.

Figure 1:
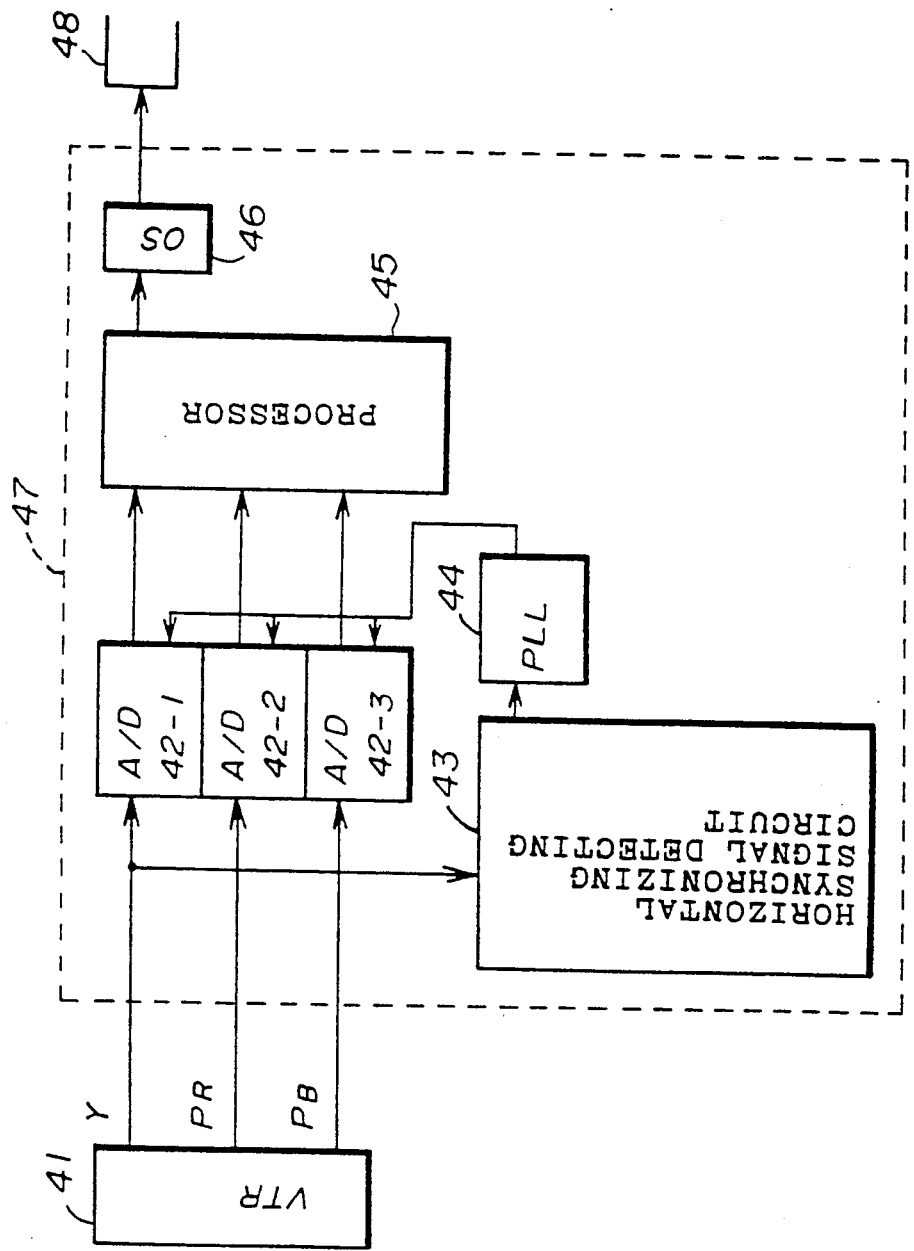
FIG. 1 shows a partial block diagram of a conventional HDTV system.
Figure 4:
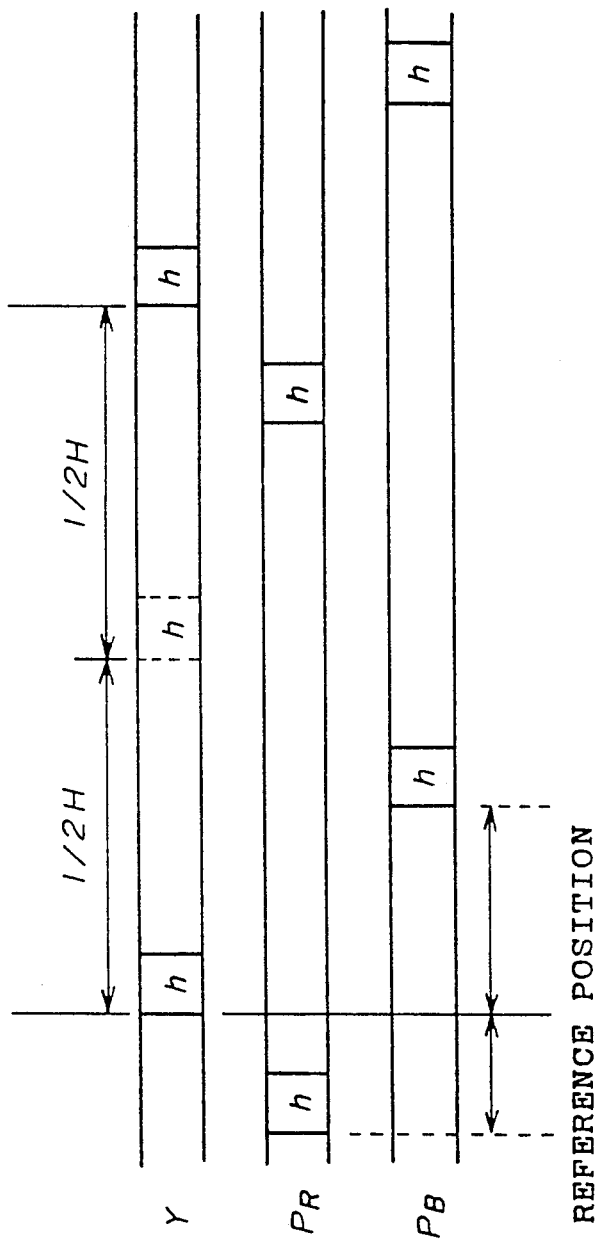
FIG. 4 shows a timing chart for explaining how to synchronize respective phases of HDTV signal components.

Each of the horizontal synchronizing signal detecting circuits 11-1 to 11-3 detects and extracts the horizontal synchronizing signal having a period of H from the corresponding signal component. Each horizontal synchronizing signal is inserted into a horizontal blanking period. The signal components Y, $P_R$ and $P_B$ are roughly indicated in FIG. 4. In this embodiment, the Y signal is determined as the reference signal. However, either $P_R$ signal or $P_B$ signal may be selected as the reference signal. The A/D converters 21-1 to 21-3, which respectively correspond to one of the A/D converters 42-1 to 42-3 shown in FIG. 1, convert analog signal components into the digital signal components. The PLL circuit 22, which correspond to the PLL circuit 44 shown in FIG. 1, outputs a clock having a frequency of, for example, 45 MHz which is synchronized with the horizontal synchronizing signal of the Y signal. The PLL circuit 22 comprises a phase detector, which compares the frequency of a voltage-controlled oscillator with that of a signal output from the horizontal synchronizing signal detecting circuit 11-1. The output of the phase detector is fed back to the voltage-controlled oscillator to keep it exactly in phase with the signal frequency. Each of the horizontal synchronizing signal detecting circuits 11-1 to 11-3 may comprise a comparator.

The fixed delay circuit 23 delays the digital signal component output from the A/D converter 21-1 by a half of period H of the horizontal synchronizing signal in synchronization with the clock output from the PLL circuit 22. As a result, the delayed Y signal lags behind the other signal components. The HDTV signal according to the BTA standard has a line frequency of 33.75 kMz, so that 1320 samples are included in 1H period of the horizontal synchronizing signal. Therefore, the Y signal is delayed by 660 samples by the fixed delay circuit 23.

Figure 5:
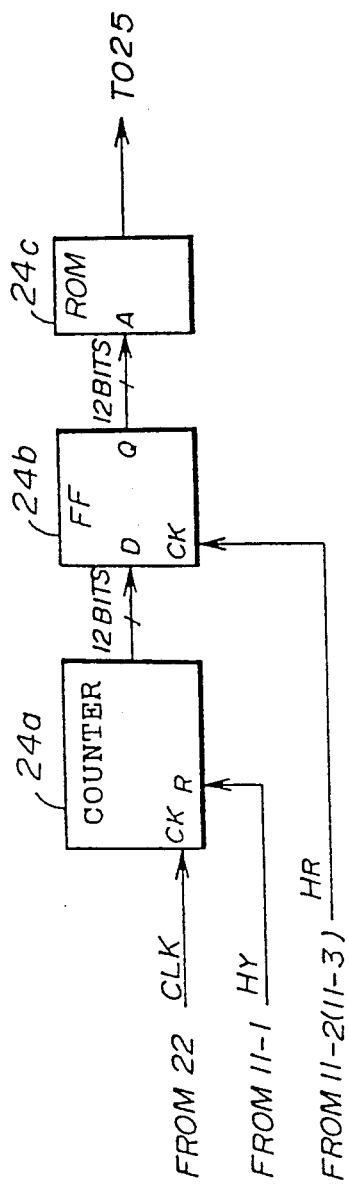
FIG. 5 shows an example of a block diagram of a time difference calculator shown in FIG. 3.

The respective time difference calculator 24-1 and 24-2 calculate the time difference between the horizontal synchronizing signals of the Y signal and the $P_R$ signal and between those of the Y signal and the $P_B$ signal, respectively. Each of the time difference calculators 24-1 and 24-2 comprises, as shown in FIG. 5, an up counter 24a, a D-type flip-flop 24b and a ROM 24c. The up counter 24a has a clock input terminal (CK) and a reset input terminal (R). The clock input terminal is coupled to the output of the PLL circuit 22. The reset input terminal is coupled to the horizontal synchronizing signal detecting circuit 11-1. The D-type flip-flop 24b has 12 data input terminals (D), a clock input terminal (CK), and 12 data output terminals (Q). The data input terminals D are respectively coupled to output terminals of the up counter 24a. The clock input terminal CK is coupled to the output of the corresponding horizontal synchronizing signal detecting circuit 11-2 or 11-3. The data output terminals are respectively coupled to address input terminals (A) of the ROM 24c. An Output Of ROM 24 is coupled to a corresponding variable delay circuit 25 (25-1 or 25-2).

The up counter 24a starts to count the number of the clocks input from the PLL circuit 22 each time the horizontal synchronizing signal is input thereto. The up counter 24a outputs 12-bit of parallel data representing the number of clocks to the respective data input terminals of the D-type flip-flop 24b. The D-type flip-flop 24b latches the data when it receives the horizontal synchronizing signal input from the horizontal synchronizing signal detecting circuit 11-2 (or 11-3) and outputs it during the period of the horizontal synchronizing signal. The data output from the D-type flip-flop 24b serves as an address of the ROM 24c. The ROM 24c outputs a delay amount corresponding to the data address output from the D-type flip-flop 24b to the corresponding variable delay circuit 25-1 (or 25-2). The ROM 24c has a table which determines the delay amount based on the data (value) output from the D-type flip-flop 24b. According to the table, if the data (A) output from the D-type flip-flop 24b is less than 660, the delay among (G) becomes 660-A. On the other hand, if A is more than 660, G becomes 660+A since the Y signal is delayed by an amount equal to 660 samples.

Figure 6:
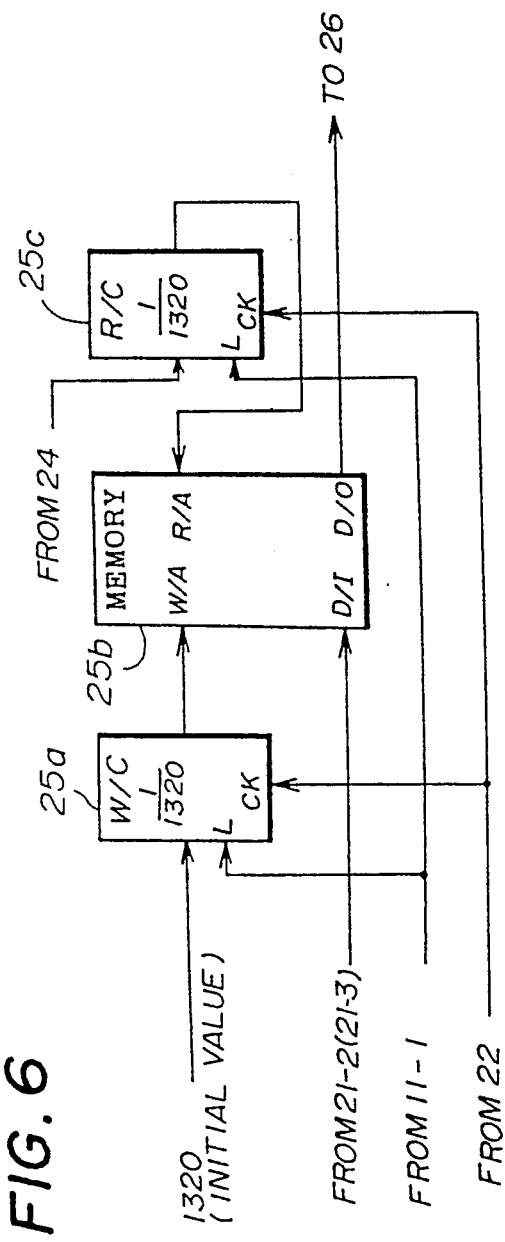
FIG. 6 shows an example of a block diagram of a variable delay circuit shown in FIG. 3.

The variable delay circuits 25-1 and 25-2 delay the horizontal synchronizing signals of the $P_R$ signal and $P_B$ signal, respectively, so that these signal can be synchronized with the horizontal synchronizing signal of the Y signal which has been delayed by ½ H. Each of the variable delay circuits 25-1 and 25-2 comprises, as shown in FIG. 6, a write counter 25a (abbreviated R/C in FIG. 6), a a memory 25b and a read counter 25c (abbreviated R/C in FIG.6). The write counter 25a has a load input terminal (L) and a clock input terminal (CK). The load input terminal is coupled to the output of the horizontal synchronizing signal detecting circuit 11-1. The clock input terminal is coupled to the output of the PLL circuit 22. Further the write counter 25a has another input terminal from which an initial value of 1320 is input thereto. The memory has a write address input terminal (W/A), a read address input terminal (R/A), a data input terminal (D/I), and a data output terminal (D/0). The write address terminal W/A is coupled to an output of the write counter 25a. The data input terminal D/I is coupled to the corresponding to the A/D converter 21-2 (or 21-3). The data output terminal D/0 is coupled to the processor 26. The read counter 25c has an load input terminal (L) and a clock input terminal (CK). An output of the read counter 25c is connected to the read address input terminal R/A of the memory 25b. The load input terminal of the read counter 25c is coupled to the output of the horizontal synchronizing signal detecting circuit 11-1. The read counter 25c has another input terminal from which the output of the corresponding one of the time difference calculator 24-1 or 24-2 is input thereto. The clock input terminal of the read counter 25c is coupled to the output of the PLL circuit 22.

The write counter 25a and the read counter 25c are each comprised of a down counter. The write counter 25a counts down from 1320 to 1 in synchronization with the clock input from the PLL circuit 22, and outputs a first counted value to the write address input terminal W/A of the memory 25b when the output of the horizontal synchronizing signal detecting circuit 11-1 is input thereto. The first counted value serves as a write address at which data output from the A/D converter 21-2 (or 21-3) is sequentially written down. The memory 25b is used for delaying the data output from the corresponding A/D converter 21-2 or 21-3 so that the horizontal synchronizing signal of the $P_R$ signal and $P_B$ signal can be respectively synchronized with that of the Y signal which has been delayed by the ½ H. The read counter 25c starts to count down from the delay amount to 1 whenever the delay amount from the ROM 24c thereto in synchronization with the clock input from the PLL circuit 22 when the output of the horizontal synchronizing signal detecting circuit 11-1 is input thereto, and outputs a second counted value to the read address input terminal of the memory 25b. The second counted value functions as the read address from which the digital signal component of the corresponding A/D converter 21-2 (or 21-3) which has been written into the memory 25b is sequentially read out. When the second counted value reaches 1, the read counter 25c is reset and starts to count down from 1320. The signal component is written into the memory 25b via the data input terminal thereof each time it receives the write address from the write counter 25a. In addition, the data output from the corresponding A/D converter 21-2 (or 21-3) is read out from the memory 25b via the data output terminal D/0 thereof each time it receives the read address corresponding to the write address from the read counter 25c.

Figure 7:
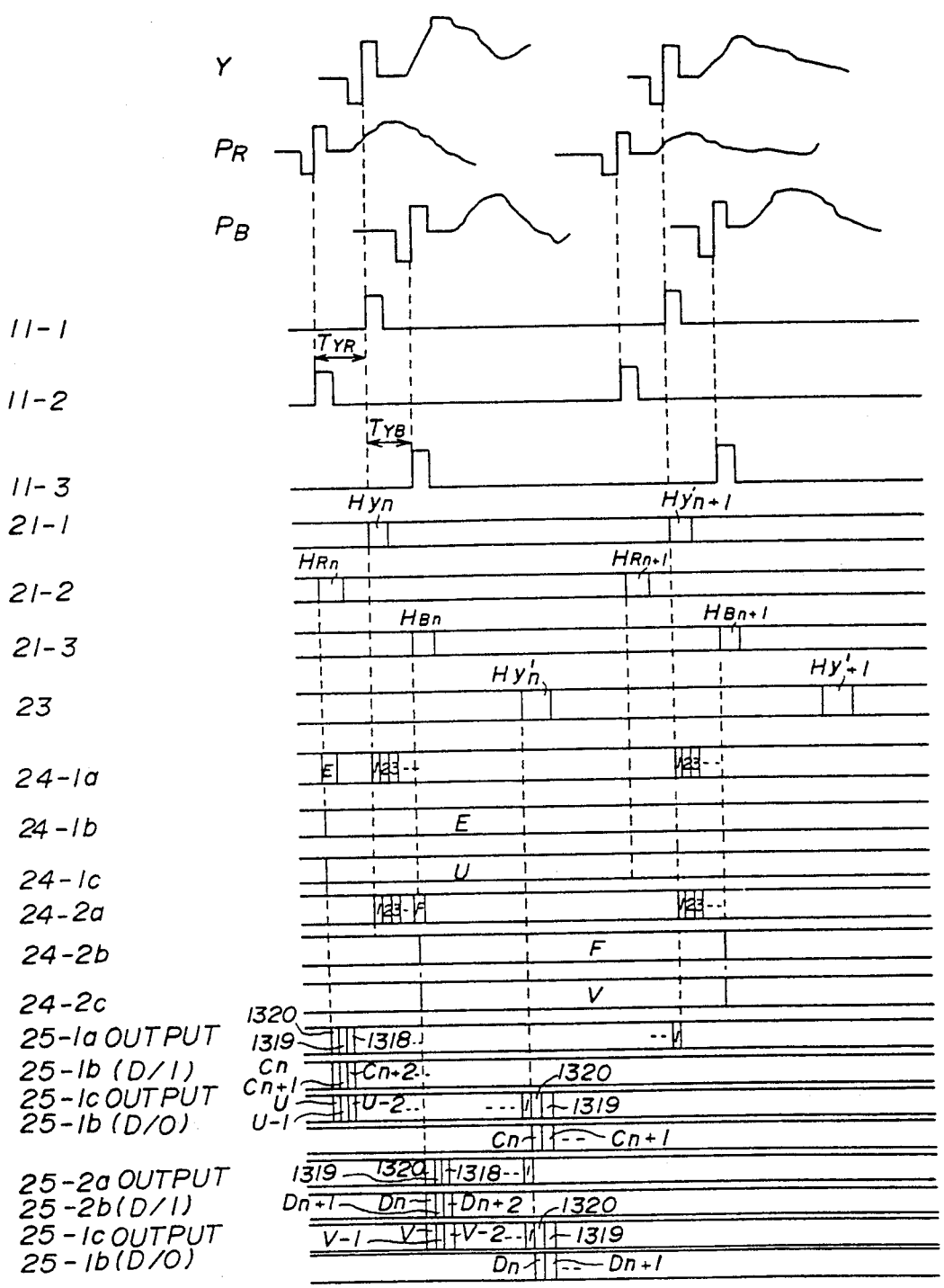
FIG. 7 shows an example of a timing chart for explaining the operation of the encoder shown in FIG. 3.

A description will now be given of the operation of the encoder 10 with reference to FIG. 7. First, the signal components of the HDTV signal, the Y signal, $P_R$ signal and $P_B$ signal are respectively input to the encoder 10 via the corresponding coaxial cables. Each of the horizontal synchronizing signal detecting circuits 11-1 to 11-3 detects and extracts the horizontal synchronizing signal from the corresponding signal component. There are time differences $T_{YR}$ between the Y signal and the $P_R$ signal and $T_{YB}$ between the Y signal and the $P_B$ signal. On the other hand, each of the A/D converters 21-1 to 21-3 converts the corresponding analog signal component into the digital signal component. Incidentally, these digital signal components are indicated by a sexadecimal number, such as $H_{Yn}$, $H_{Yn+1}$, $H_{Rn}$, $H_{Rn+1}$, $H_{Bn}$ and $H_{Bn+1}$. The horizontal synchronizing signal of the Y signal is input into the time difference calculators 24-1 and 24-2 and the PLL circuit 22. The horizontal synchronizing signal of the $P_R$ signal is input into the time difference calculator 24-1. The horizontal synchronizing signal of the $P_B$ signal is input into the time difference calculator 24-2. The clock, which is synchronized with the horizontal synchronizing signal of the Y signal, is input from the PLL circuit 22 to the respective A/D converters 21-1 to 21-3, time difference calculators 24-1 and 24-2, and variable delay circuits 25-1 and 25-2. On the other hand, the digital signal component output from the A/D converter 21-1 is input to the fixed delay circuit 23. The digital signal component output from the A/D converter 21-2 is input to the variable delay circuit 25-1 in synchronization with the clock. The digital signal component output from the A/D converter 21-2 is input to the variable delay circuit 25-2 in synchronization with the clock. When the clock and the horizontal synchronizing signal of the Y signal are respectively input into the up counter 24a, the up counter 24-1a starts to count up from 1 and outputs the counted value to the D-type flip-flop 24-1b. Subsequently, when the horizontal synchronizing signal of the $P_R$ signal is input to the D-type flip-flop 24-1b, the D-type flip-flop 24-1b latches the counted value "E" when the horizontal synchronizing signal thereof is input thereto, and outputs the counted value "E" to the ROM 24-1c in synchronization with the horizontal synchronizing signal of the PR signal. The ROM 24-1c outputs the delay amount "U" corresponding to "E" by means of the table stored therein to the 25-1c of the variable delay circuit 25-1. Likewise, when the clock and the horizontal synchronizing signal of the Y signal are respectively input into the up counter 24a, the up counter 24-2a starts to count up from 1 and outputs the counted value to the D-type flip-flop 24-2b. Subsequently, when the horizontal synchronizing signal of the $P_B$ signal is input to the D-type flip-flop 24-2b, the D-type flip-flop 24-2b latches the counted value "F" when the horizontal synchronizing signal of the $P_B$ signal is input thereto, and outputs the counted value "F" to the ROM 24-2c in synchronization with the horizontal synchronizing signal of the $P_B$ signal. The ROM 24-2c outputs the delay amount "V" corresponding to "F" by means of the table stored therein to the 25-2c of the variable delay circuit 25-2. The write counter 25-1a of the variable delay circuit 25-1 starts to count down from 1320 when the digital signal component is input from the A/D converter 21-2 thereto in synchronization with the clock, and sequentially outputs the first counted value to the memory 25-1b. The digital signal component output is sequentially written down, such as $C_n$, $C_{n+1}$, $C_{n+2}$..., in the memory 25-1b at the write address determined by the first counted value. On the other hand, the read counter 25-1c starts to count down from "U" when the delay amount "U" is input into the read counter 25-1c in synchronization with the clock, and sequentially outputs the second counted value to the memory 25-1b. When the second counted value reaches 1320, the digital signal component is output from the read address corresponding to the second counted value in the memory 25-1b. Therefore, the digital signal component is delayed at the variable delay circuit 25-1 by "U"*(one clock period). Likewise, the write counter 25-2a of the variable delay circuit 25-1 starts to count down from 1320 when the digital signal component is input from the A/D converter 21-3 thereto in synchronization with the clock, and sequentially outputs the first counted value to the memory 25-2b. The digital signal component output is sequentially written down, such as $D_n$, $D_{n+1}$, $D_{n+2}$..., in the memory 25-2b at the write address determined by the first counted value. On the other hand, the read counter 25-2c starts to count down from "V" when the delay amount "V" is input into the read counter 25-2c in synchronization with the clock, and sequentially outputs the second counted value to the memory 25-2b. When the second counted value reaches 1320, the digital signal component is output from the read address corresponding to the second counted value from the memory 25-2b. Therefore, the digital signal component is delayed at the variable delay circuit 25-2 by "V"*(one clock period). The "U" and "V" are respectively determined so that the digital signal components output from the A/D converters 21-2 and 21-3 can be respectively synchronized, despite the time differences $T_{YR}$ and $T_{YB}$, with the digital signal component of the Y signal which is delayed by ½ H. Incidentally, $C_n$, $C_{n+1}$, $C_{n+2}$ . . .

correspond to the $H_{Rn}$, and $D_n$, $D_{n+1}$, $D_{n+2}$... correspond to the $H_{Bn}$. Thus, respective phases of the digital signal components are synchronized with one another when the digital signal components are respectively input into the processor 26. The processor 26 encodes the digital signal components and outputs the encoded HDTV signal to the OS 31. Lastly, the encoded HDTV signal is converted into the optical signal by the OS 31, and then transmitted via an optical transmission line 32.

Figure 8:
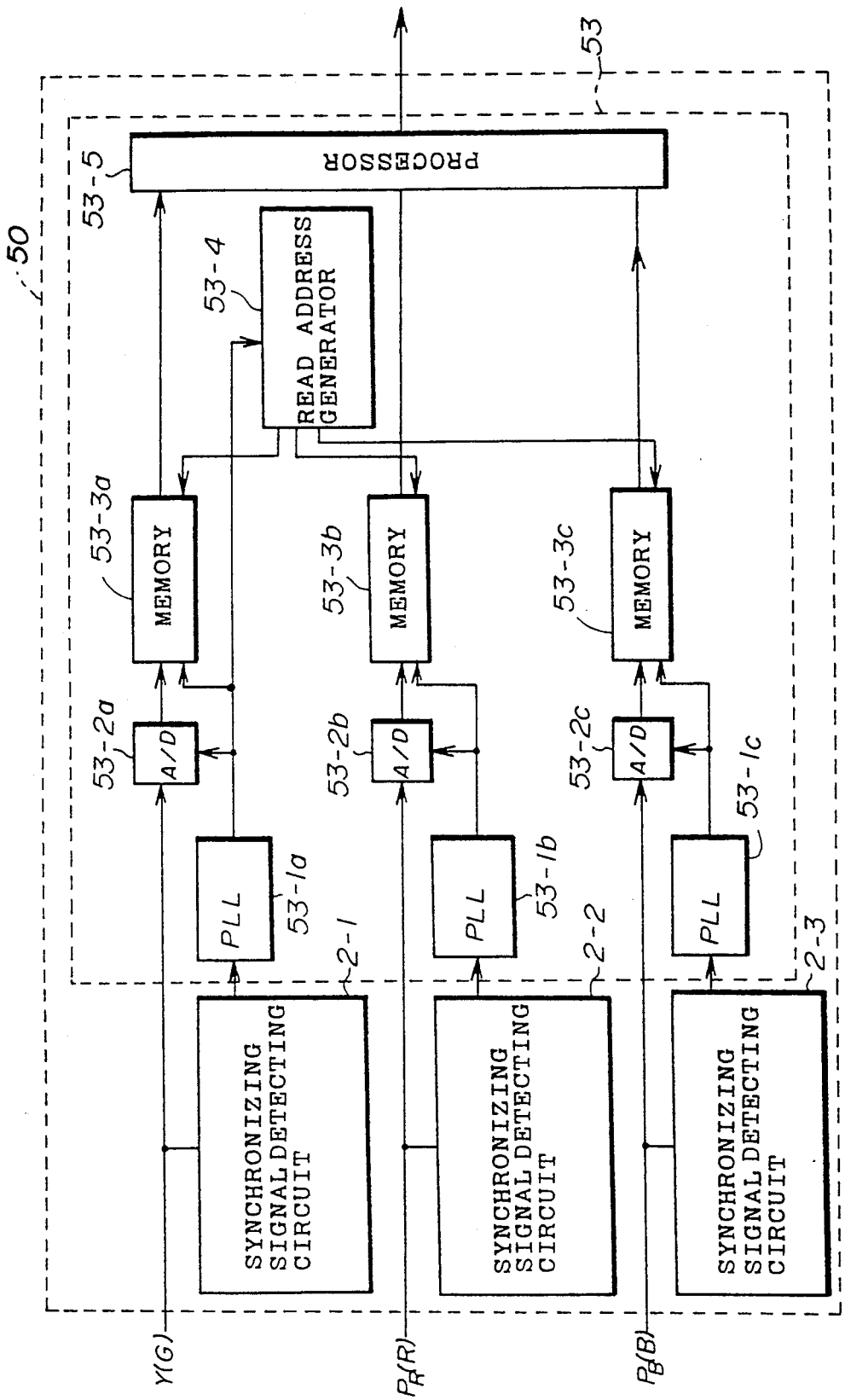
FIG. 8 shows a second principle block diagram of the present invention.

Next, a description will now be given of an apparatus 50 for synchronizing respective phases of HDTV signal components of the second embodiment according to the present invention with reference to FIG. 8. This apparatus 50 can additionally handle the time difference between the reference signal and another signal element which is less than a period of the clock generated by the PLL circuit. The apparatus 50 comprises synchronizing signal detecting circuits 2-1 to 2-3 and a correction device 53. The synchronizing signal detecting circuits 2-1 to 2-3 are indicated in FIG. 2, and thus a duplicate description thereof will be omitted.

The correction circuit 53 of this embodiment comprises PLL circuits 53-1a to 53-1c, A/D converters 53-2a to 53-2c, memories 53-3a to 53-3c, a read address generator 53-4 and a processor 53-5. Each of the PLL circuits 53-1a to 53-1c is connected to a corresponding one of the synchronizing signal detecting circuits 2-1 to 2-3, a corresponding one of the A/D converters 53-2a to 53-2c, and a corresponding one of the memories 53-3a to 53-3c. That is, the PLL circuit 53-1a is connected to the synchronizing signal detecting circuit 2-1, the A/D converter 53-2a, and the memory 53-3a. In addition, the PLL circuit 53-1b is connected to the synchronizing signal detecting circuit 2-2, the A/D converter 53-2b, and the memory 53-3b. Moreover, the PLL circuit 53-1c is connected to the synchronizing signal detecting circuit 2-3, the A/D converter 53-2c, and the memory 53-3c. The PLL circuit 53-1a is further connected to the read address generator 53-4. Each of the A/D converters 53-2a to 53-2c is further connected to a corresponding one of the synchronizing signal detecting circuits 2-1 to 2-3 and a corresponding one of the memories 53-3a to 53-3c. That is, the A/D converter 53-2a is further connected to the synchronizing signal detecting circuit 2-1 and the memory 53-3a. In addition, the A/D converter 53-2b is further connected to the synchronizing signal detecting circuit 2-2 and the memory 53-3b. Moreover, the A/D converter 53-2c is further connected to the synchronizing signal detecting circuit 2-3 and the memory 53-3c. Each of the memories 53-3a to 53-3c is further connected to the read address generator 53-4 and the processor 53-5.

Each PLL circuit generates a clock which is synchronized with a synchronizing signal output from the corresponding synchronizing signal detecting circuit, and outputs the clock to the corresponding A/D converter and the corresponding memory. Incidentally, the PLL circuit 53-1a further outputs the clock to the read address generator 53-4 because the Y signal is set to be the reference signal.

Each A/D converter converts the corresponding analog signal component into a digital signal component in synchronization with the clock output from the corresponding PLL circuit. Since the PLL circuits 53-1a to 53-1c are provided for every synchronizing signal detecting circuit, each sampling phase of each signal component can be constantly fixed. Incidentally, the term "sampling phase", as used herein, means a phase between successive points to be sampled.

Each memory writes down the corresponding digital signal component at a predetermined write address therein in synchronization with the clock output from the corresponding PLL circuit. In addition, each digital signal component stored in the corresponding memory is read out from a read address output from the read address generator 53-4 in synchronization with the clock output from the corresponding PLL circuit. Therefore, each memory functions as a delay circuit.

The read address generator 53-4 generates the read address in synchronization with the clock output from the PLL circuit 53-1a so that respective phases of the digital signal components stored in the memories can be synchronized with each other before the digital signal components are input into the processor 53-5. That is, the read address generator 53-5 calculates the time differences among three synchronizing signals based on the outputs of the respective synchronizing signal detecting circuit 2-1 to 2-3. Furthermore, the read address generator 53-5 corrects the time differences so as to synchronize the respective phases of the HDTV signal components with one another.

The processor 53-5 corresponds to the processor 26 shown in FIG.3, and thus a duplicate description will be omitted.

In operation, each HDTV signal component is input into the apparatus 50 via the corresponding one of the coaxial cables, so that each HDTV signal component is input to the corresponding one of the synchronizing signal detecting circuits 2-1 to 2-3 and the correction device 53. When the synchronizing signal is extracted and output from the corresponding synchronizing signal detecting circuit to the corresponding PLL circuit, the PLL circuit generates the clock in synchronization with the synchronizing signal. In synchronization with the clock, the corresponding A/D converter converts the analog signal component into the digital signal component and the digital signal component is written down at the predetermined write address in the corresponding memory. Hereupon, the sampling phase of each signal component is constantly fixed. On the other hand, the read address generator 53-4 generates the read address in synchronization with the clock output from the PLL circuit 53-1a, and outputs the read address to the respective memories 53-3a to 53-3c. Each digital signal component is read out from the read address in the corresponding memory, so that the respective phases of the digital signal components are synchronized with one another before the digital signal components are input into the processor 53-5. Lastly, the processor 53-5 encodes and outputs each digital signal component to a next stage. Needless to say, the correction device may include the OS therein, as shown in FIG. 3.

Figure 9:
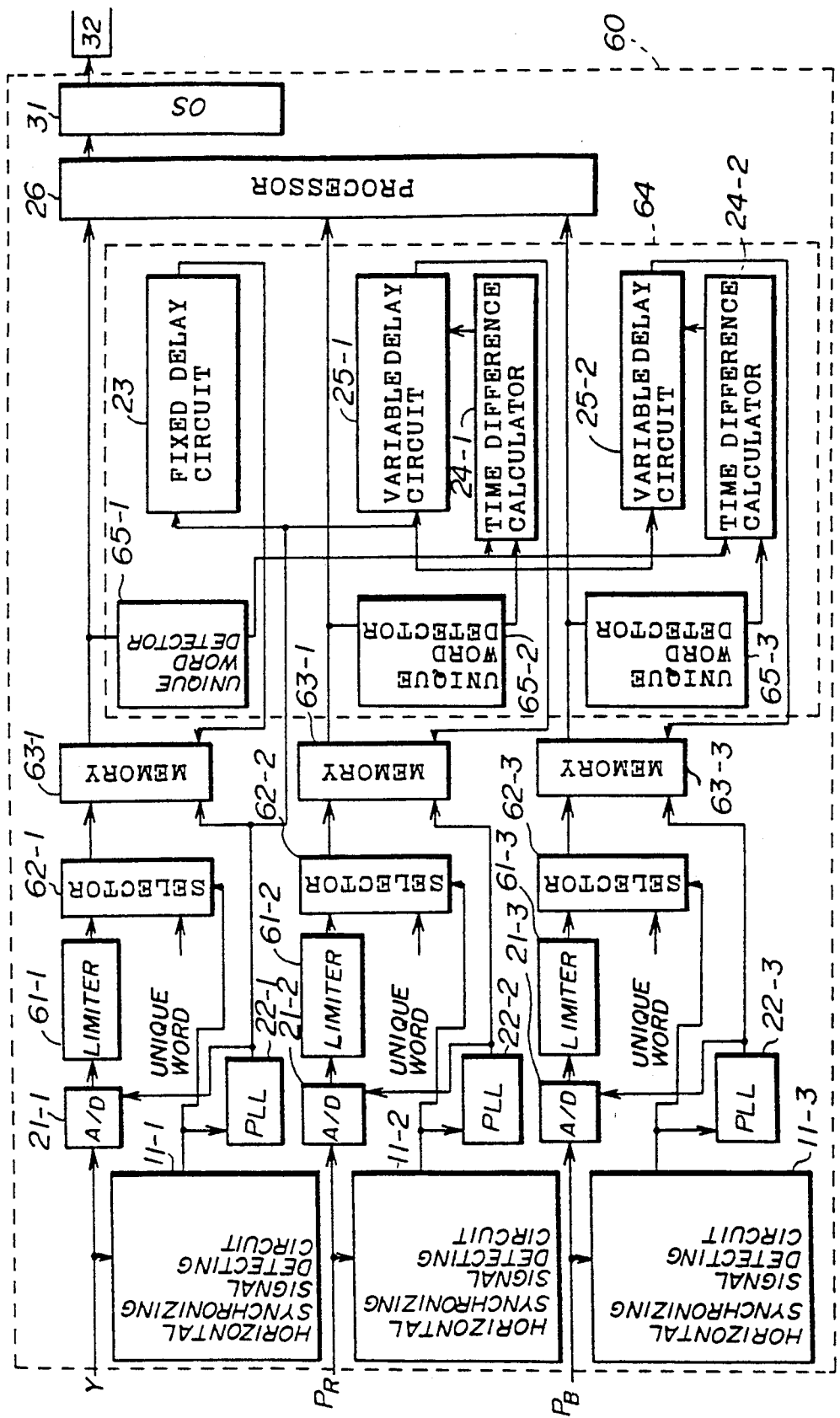
FIG. 9 shows a block diagram of an encoder of a second embodiment according to the present invention.

A description will now be given of the encoder 60 of the second embodiment according to the present invention. The encoder 60 comprises, as shown in FIG. 9, the horizontal synchronizing signal detecting circuits 11-1 to 11-3, the A/D converters 21-1 to 21-3, PLL circuits 22-1 to 22-3, limiters 61-1 to 61-3, selectors 62-1 to 62-3, memories 63-1 to 63-3, a read address generating part 64, the processor 26 and the OS 31. Also in this embodiment, the Y signal, $P_R$ signal and $P_B$ signal are respectively input into the encoder 60 via a corresponding coaxial cable. In addition, the encoder 60 is coupled to the optical line transmission 32. Those elements which are the same as corresponding elements in FIG.3 are designated by the same reference numerals, and a duplicate description thereof will be omitted. Needless to say, a vertical synchronizing signal may be used for the synchronizing signal detecting circuit, as mentioned above. Each horizontal synchronizing signal detecting circuit and each A/D converter are respectively coupled to the corresponding coaxial cable. Each horizontal synchronizing signal detecting circuit is further coupled to the corresponding PLL circuit and the corresponding selector. Each A/D converter is further coupled to the corresponding PLL circuit and the corresponding limiter. Each PLL circuit is further coupled to the corresponding memory. In addition, the PLL circuit 22-1 is coupled to the read address generating part 64. Each limiter is further coupled to the corresponding selector. Each selector is further coupled to the corresponding memory. Each memory is further coupled to the read address generating part 64 and the processor 26.

Figure 10:
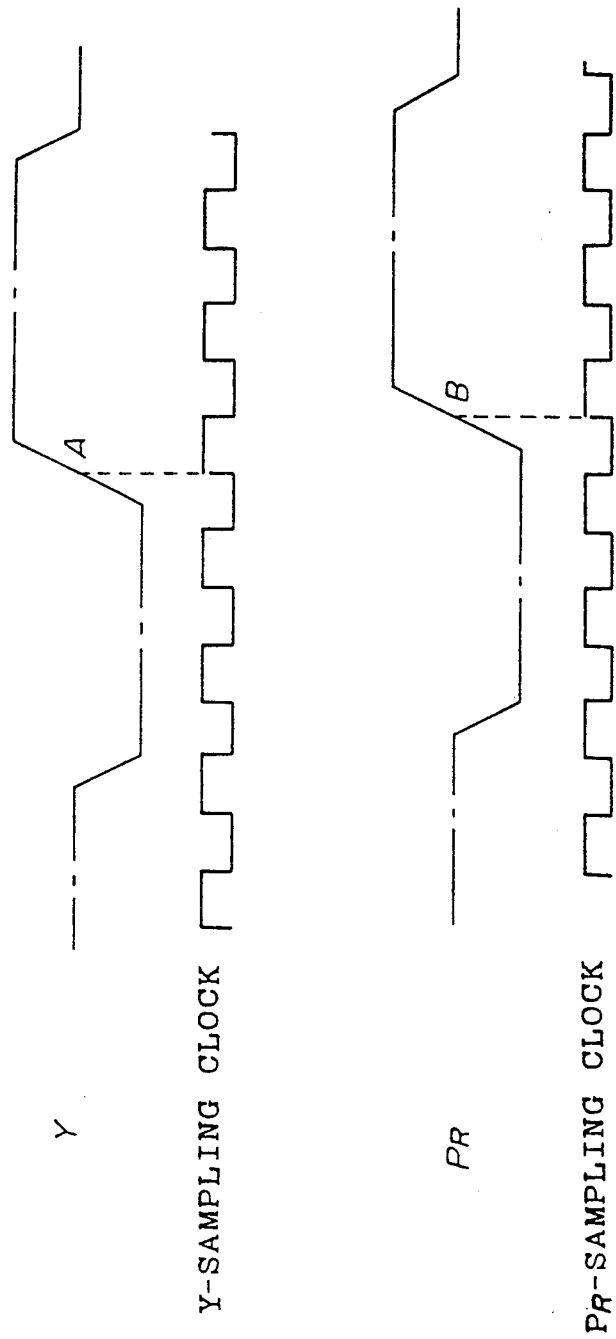
FIG. 10 shows a relationship between a horizontal synchronizing signal and a clock.

Since the PLL circuit is provided for every synchronizing signal detecting circuit, each sampling phase of each signal component can be constantly fixed. As shown in FIG. 10, even if there is a phase difference between the Y signal and the $P_R$ signal, the sampling clock is synchronized with the leading edge points "A" and "B". Needless to say, the sampling clock is the clock output from the corresponding PLL circuit.

Figure 11:
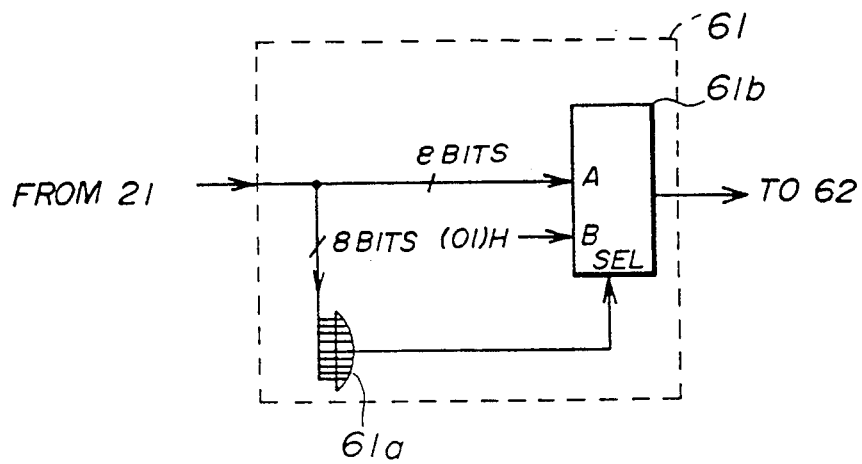
FIG. 11 shows an example of the block diagram of a limiter shown in FIG. 9.

Each of the limiter 61-1 to 61-3 comprises, as shown in FIG. 11, an OR circuit 61a and a selector 61b. The OR circuit 61a is coupled to an output terminal of the corresponding A/D converter 21 and a select input terminal of the selector 61b. The selector 61b has an "A" input terminal, a "B" input terminal and the select input terminal. An output terminal of the selector 61b is coupled to the corresponding selector 62.

The A/D converter 21 supplies the 8-bit digital signal component in parallel to both input terminals of the OR circuit 61a and the "A" input terminal of the selector 61b. The OR circuit 61a executes the logical sum for the 8-bit digital signal component. The output of the OR circuit 61a is supplied to the select terminal of the selector 61b. The selector 61b becomes at a high level when the OR circuit 61a outputs "1" thereto, and becomes at a low level when the OR circuit 61a outputs "0" thereto. A signal of $(01)_H$ is input to the "B" input terminal of the selector 61b. The selector 61b selects the signal which is input to the "A" input terminal when it becomes at the high level, and selects the signal which is input to the "B" input terminal when it becomes at the low level. Thus, the limiter 61 prevents $(00)_H$ from being input to the selector 62. The data of (00)H is unlikely to be generated from the A/D converter 21. However, since $(00)_H$ is assigned to a unique word which will be described later, the limiter 61 prevents it from being input to the selector 62.

In operation, when the 8-bit digital signal component which is $(00)_H$ is supplied to the limiter 61, the OR circuit 61a outputs "0" to the select terminal of the selector 61b. Consequently, the selector 61b becomes at the high level, and it selects and outputs $(01)_H$ to the selector 61. On the other hand, when the 8-bit digital signal component which is not $(00)_H$ is supplied to the limiter 61, the OR circuit 61a outputs "1" to the select terminal of the selector 61b. Consequently, the selector 61b becomes at the low level, and it selects and outputs the digital signal component as it is to the selector 61.

Figure 12:
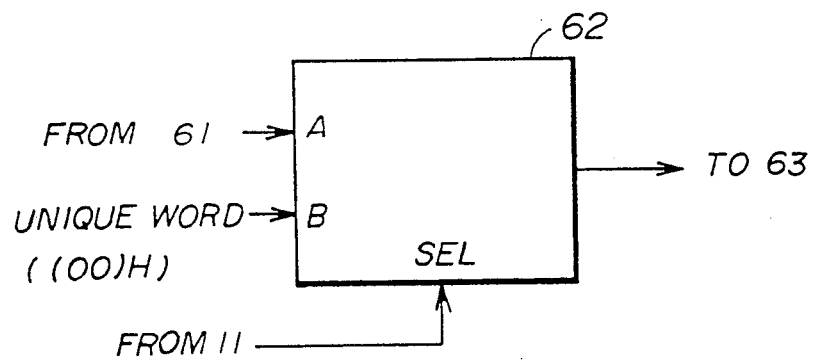
FIG. 12 shows an example of the block diagram of a selector shown in FIG. 9.
Figure 13:
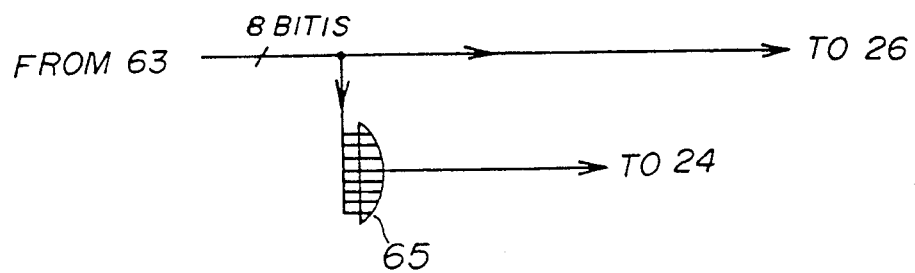
FIG. 13 shows an example of the block diagram of a unique word detector shown in FIG. 9.

The selector 63 has, as shown in FIG. 12, the "A" input terminal, the "B" input terminal and the select input terminal. The "A" input terminal is coupled to the output terminal of the corresponding limiter 61. The "B" input terminal is coupled to a device which outputs a unique word thereto. And the select input terminal is coupled to an output terminal of the corresponding horizontal synchronizing signal detecting circuit 11. The selector 62 becomes at a low level when the leading edge of the horizontal synchronizing signal is input thereto, and becomes at a high level when a part except the leading edge of the horizontal synchronizing signal is input thereto. The selector 62 selects the signal which is input to the "B" input terminal when it becomes at the low level, and selects the signal which is input to the "A" input terminal when it becomes at the high level. In operation, if the leading edge of the horizontal synchronizing signal is input to the selector 62, the selector 62 selects the unique word. Consequently, $(00)_H$ is output to the corresponding memory. On the other hand, if a part except the leading edge of the horizontal synchronizing signal is input to the selector 62, it selects the output of the limiter 61.

Each memory writes down the corresponding digital signal component at the write address and reads it out from the read address. The memories 63-1 to 63-3 correspond to the memories 25b in FIG. 6, and thus a duplicate description thereof will be omitted.

The read address generating part 64 generates the read address used for the respective memories 63-1 to 63-3. The read address generating part 64 comprises, as shown in FIG. 9, unique word detectors 65-1 to 65-3, the fixed delay circuit 23, the time difference calculators 24-1 and 24-2, and the variable delay circuits 25-1 and 25-2. Those elements which are the same as corresponding elements in FIG.3 are designated by the same reference numerals, and a duplicate description thereof will be omitted. The unique word detector 65-1 is coupled to the memory 63-1 and the processor 26 and the time difference calculators 24-1 and 24-2. The unique word detector 65-2 is coupled to the memory 63-2 and the processor 26 and the time difference calculators 24-1. And the unique word detector 65-3 is coupled to the memory 63-3 and the processor 26 and the time difference calculators 24-2. The fixed delay circuit 23 is coupled to the PLL circuit 22-1 and variable delay circuits 25-1 and 25-2. The time difference calculator 24-1 is further coupled to the variable delay circuit 25-1. The time difference calculator 24-2 is further coupled to the variable delay circuit 25-2.

Each unique word detector 65 may be comprised, as shown in FIG. 12, the OR circuit. If the unique word which is $(00)_H$ is input to the OR circuit, it outputs "0" to the time difference calculator 24. The unique word detector 65-1 outputs "0" to both time difference calculator 24-1 and 24-2. The unique word detector 65-2 outputs "0" to time difference calculator 24-1. And the unique word detector 65-3 outputs "0" to the time difference calculator 24-2.

A description will now be given of the operation of the encoder 50. First, the signal components of the HDTV signal, the Y signal, $P_R$ signal and $P_B$ signal are respectively input to the encoder 50 via the corresponding coaxial cables. Each of the horizontal synchronizing signal detecting circuits 11-1 to 11-3 detects and extracts the horizontal synchronizing signal from the corresponding signal component. Although there are time differences $T_{YR}$ between the Y signal and the $P_R$ signal and $T_{YB}$ between the Y signal and the PB signal, in this embodiment, each time difference is restricted within the ½ H which is the period of the horizontal synchronizing signal. Incidentally, according to BTA-S001 standard, H=14.8 us. The horizontal synchronizing signal of the Y signal is input into the selector 62-1 and the PLL circuit 22-1. The horizontal synchronizing signal of the $P_R$ signal is input into the selector 62-2 and the PLL circuit 22-2. And the horizontal synchronizing signal of the $P_B$ signal is input into the selector 62-3 and the PLL circuit 22-3. Then the clock is input from the PLL circuit 22-1 to the A/D converter 21-1, the memory 63-1, the fixed delay circuit 23, and the variable delay circuits 25-1 and 25-2. In addition, the clock is input from the PLL circuit 22-2 to the A/D converter 21-2 and the memory 63-2. Moreover, the clock is input from the PLL circuit 22-3 to the A/D converter 21-3 and the memory 63-3. Each of the A/D converters 21-1 to 21-3 converts the corresponding analog signal component into the digital signal component in synchronization with the clock output from the corresponding PLL circuit. Next, the digital signal component output from the corresponding A/D converter is input to the corresponding limiter. Each limiter outputs a predetermined signal to the corresponding selector. Each selector selects either the predetermined signal or the unique word based on the horizontal synchronizing signal output from corresponding horizontal synchronizing signal detecting circuit. As a result, $(00)_H$ is assigned to the leading edge of each signal component based on the leading edge of each horizontal synchronizing signal. Thus, each digital signal component including $(00)_H$ is written down at the corresponding address in the corresponding memory in synchronization with the clock output from the corresponding PLL circuit. The time difference calculator 24-1 calculate a time difference between the Y signal and the $P_R$ signal on the basis of respective leading edges thereof detected by the unique word detectors 65-1 and 65-2. The time difference calculator 24-2 calculate a time difference between the Y signal and the $P_B$ signal on the basis of respective leading edges thereof detected by the unique word detectors 65-1 and 65-3. Since the read address of the Y signal, which is the reference signal, is determined at the fixed delay circuit 23 in synchronization with the clock output from the PLL circuit 22-1 so that it can be delayed by ½ H. On the other hand, respective read addresses of the $P_R$ signal and the $P_B$ signal are determined at the corresponding variable delay circuits 25-1 and 25-2 in synchronization with the clock output from the PLL circuit 22-1 so that their respective phases can be synchronized with the Y signal which is delayed at the fixed delay circuit 23. Thus, because of the read addresses output from the read address generating part 64, digital signal components are respectively read out so that their respective phases can be synchronized with each other before they are input into the processor 26. The processor 26 encodes each digital signal component and outputs the encoded HDTV signal to the OS 31. Lastly, the encoded HDTV signal is converted into the optical signal by the OS 31, and then transmitted via an optical transmission line 32.

Further, the present invention is not limited to these preferred embodiments, but various variations and modifications may be made without departing from the scope of the present invention.

What is claimed is:

1. An apparatus which receives a HDTV signal comprising first, second and third signal components, said apparatus comprising:

first synchronizing signal detecting means for detecting a first synchronizing signal from the first signal component;

second synchronizing signal detecting means for detecting a second synchronizing signal from the second signal component;

third synchronizing signal detecting means for detecting a third synchronizing signal from the third signal component;

correction means, coupled to said first, second and third synchronizing signal detecting means, for correcting phase differences among the first, second and third synchronizing signals and constructed so that respective phases of the first, second and third signal components are synchronized with one another; and processing means receiving said first, second and third signal components having respective phases thereof synchronized by said correction means and being connected to an output transmission line to output thereto the HDTV signal with synchronized signal components;

wherein said correction means comprises:
  first, second and third A/D converters, each of which is coupled to a corresponding one of said first, second and third synchronizing signal detecting means;
  first, second and third PLL means, each of which is coupled to the corresponding one of the first, second and third synchronizing signal detecting means and a corresponding one of the first, second and third A/D converters, each PLL means generating a corresponding one of first, second and third clock signals in synchronization with a corresponding one of the first, second and third synchronizing signals, and each A/D converter converting a corresponding signal component in synchronization with the clock output from the corresponding PLL means;
  first, second and third memories, each of which is coupled to the corresponding A/D converter and the corresponding PLL means, each digital signal component being input from the corresponding A/D converter to the corresponding memory in synchronization with a corresponding clock, written down at a write address of the corresponding memory, and read out from a read address thereof; and
  read address generating means, coupled to the PLL means which is connected to said first synchronizing signal detecting means and the three memories, for generating and supplying read addresses to the respective memories, each read address being determined so that the respective phases of signal components can be synchronized with each other.

2. An apparatus according to claim 1, wherein said read address generating means further comprises:

first time difference calculating means for calculating a first time difference between the first and second signal components;

second time difference calculating means for calculating a second time difference between the first and third signal components;

first delay means, coupled to the first synchronizing signal detecting means for generating a first read address so as to generate a delayed first signal component;

second delay means, coupled to the first synchronizing signal detecting means, for generating a second read address based on the first time difference so that the phase of the second signal component can be synchronized with that of the delayed first signal component; and third delay means, coupled to the first synchronizing signal detecting means, for generating a third read address based on the second time difference so that the phase of the third signal component can be synchronized with that of the delayed first signal component.

3. An apparatus according to claim 2, wherein said first and second time difference calculating means calculate the first and second time difference on the basis of a reference point of each signal component.

4. An apparatus according to claim 1, wherein said apparatus is used for an encoder which encodes the HDTV signal.

5. An apparatus according to claim 3, wherein the reference point is a leading edge point of each signal component, and said correction means further comprises unique word adding means, coupled to the corresponding A/D converter, for adding a unique word to the leading edge point of each digital signal component output from the corresponding A/D converter, each leading edge point being detected by the corresponding synchronizing signal detected by the corresponding one of the first, second and third synchronizing signal detecting means.

6. An apparatus according to claim 5, wherein the read address generating means further comprises unique word detecting means, coupled to the corresponding memories and the first and/or second time difference calculating means, for detecting the unique word.

7. An apparatus according to claim 5 wherein said correction means further comprises:

first, second and third limiters, each of which is coupled to the corresponding A/D converter, and each of which removes a data equal to the unique word from the corresponding digital signal component;

first, second and third selectors, each of which is coupled to a corresponding limiter and unique word adding means, and each of which selects the unique word when the leading edge point is input therein from the corresponding synchronizing signal detecting means and selects an output from the corresponding limiter when a part other than the leading edge point is input thereto.

8. An apparatus according to claim 6, wherein said unique word detecting means comprises an OR circuit.

9. An apparatus according to claim 3, wherein the reference point is a trailing edge point of each signal component, and said correction means further comprises unique word adding means, coupled to the corresponding A/D converter, for adding a unique word to the trailing edge point of each digital signal component output from the corresponding A/D converter, each trailing edge point being detected by the corresponding synchronizing signal detected by the corresponding one of the first, second and third synchronizing signal detecting means.

10. An apparatus according to claim 9, wherein the read address generating means further comprises unique word detecting means, coupled to the corresponding memories and first and/or second time difference calculating means, for detecting the unique word.

11. An apparatus according to claim 9, wherein said correction means further comprises:

first, second and third limiters, each of which is coupled to the corresponding A/D converter, and each of which removes a data equal tot he unique word from the corresponding digital signal component;

first, second and third selectors, each of which is coupled to a corresponding limiter and unique word adding means, and each of which selects the unique word when the trailing edge point is input therein from the corresponding synchronizing signal detecting means and selects an output from the corresponding limiter when a part other than the trailing edge point is input thereto.

12. An apparatus according to claim 11, wherein the unique word comprises a data representing "0", and each limiter comprises:

an OR circuit; and a selector, coupled to the OR circuit, the selector selecting the corresponding digital signal component when the OR circuit transmits "1" thereto, and selecting a data other than "0" when the OR circuit transmits "0" thereto.

13. An apparatus according to claim 11, wherein the unique word comprises a data representing "0", and each limiter comprises:

an OR circuit; and a selector, coupled to the OR circuit, the selector selecting the corresponding digital signal component when the OR circuit transmits "1" thereto, and selecting a data other than "0" when the OR circuit transmits "0" thereto.

14. An apparatus according to claim 10, wherein said unique word detecting means comprises an OR circuit.

* * * * *